(12) United States Patent
Moliner Clemente et al.

(10) Patent No.: US 12,157,274 B2
(45) Date of Patent: Dec. 3, 2024

(54) SENSING BUILD MATERIAL IN ADDITIVE MANUFACTURING SYSTEMS

(71) Applicant: HEWLETT-PACKARD DEVELOPMENT COMPANY, L.P., Spring, TX (US)

(72) Inventors: Guillermo Moliner Clemente, Sant Cugat del Valles (ES); Eduard Galdeano Castillo, Sant Cugat del Valles (ES); Alejandro Torres Pinero, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 335 days.

(21) Appl. No.: 17/433,565

(22) PCT Filed: Apr. 29, 2019

(86) PCT No.: PCT/US2019/029686
§ 371 (c)(1),
(2) Date: Aug. 24, 2021

(87) PCT Pub. No.: WO2020/222754
PCT Pub. Date: Nov. 5, 2020

(65) Prior Publication Data
US 2022/0143926 A1    May 12, 2022

(51) Int. Cl.
| | | |
|---|---|---|
| *F25B 49/02* | (2006.01) | |
| *B29C 64/205* | (2017.01) | |
| *B29C 64/245* | (2017.01) | |
| *B29C 64/321* | (2017.01) | |
| *B29C 64/393* | (2017.01) | |
| *B33Y 10/00* | (2015.01) | |
| *B33Y 30/00* | (2015.01) | |
| *B33Y 50/02* | (2015.01) | |

(Continued)

(52) U.S. Cl.
CPC .......... *B29C 64/393* (2017.08); *B29C 64/205* (2017.08); *B29C 64/245* (2017.08); *B29C 64/321* (2017.08); *B33Y 10/00* (2014.12); *B33Y 30/00* (2014.12); *B33Y 50/02* (2014.12)

(58) Field of Classification Search
CPC ... B29C 64/393; B29C 64/321; B29C 64/245; B29C 64/205; B33Y 10/00; B33Y 30/00; B33Y 50/02
USPC .......................................................... 700/119
See application file for complete search history.

(56) References Cited

U.S. PATENT DOCUMENTS 6,672,343 B1   1/2004   Perret et al.
7,887,316 B2   2/2011   Cox
(Continued)

FOREIGN PATENT DOCUMENTS

CN        109073361 A       12/2018
WO    WO-2017005301 A1      1/2017
(Continued)

*Primary Examiner* — Md Azad
(74) *Attorney, Agent, or Firm* — Shook, Hardy & Bacon L.L.P.

(57) ABSTRACT

An additive manufacturing system having a sensor module. The sensor module including a distance sensor to provide an indication of a position of a top surface of a volume of build material. The system includes a processor to determine whether the volume of build material should be reformed based on the indication.

20 Claims, 4 Drawing Sheets

(51) Int. Cl.
    *F25D 11/00* (2006.01)
    *G05B 15/02* (2006.01)

(56) References Cited

U.S. PATENT DOCUMENTS

| | | | |
|---|---|---|---|
| 11,666,985 B2* | 6/2023 | Riemann | B23K 26/342 |
| | | | 700/119 |
| 2005/0280185 A1 | 12/2005 | Russell et al. | |
| 2015/0210011 A1* | 7/2015 | Conrow | B29C 64/112 |
| | | | 425/169 |
| 2016/0252384 A1* | 9/2016 | Wilson | A01D 41/00 |
| | | | 73/149 |
| 2017/0334024 A1 | 11/2017 | Buller et al. | |
| 2018/0001567 A1 | 1/2018 | Juan et al. | |
| 2018/0071985 A1* | 3/2018 | Gimenez Manent | B33Y 40/00 |
| 2018/0072000 A1* | 3/2018 | Riemann | B33Y 30/00 |
| 2018/0264590 A1* | 9/2018 | Goldfine | G01K 13/10 |
| 2019/0001575 A1* | 1/2019 | Lopez | B29C 64/165 |
| 2019/0022946 A1* | 1/2019 | Jones | B29C 64/153 |
| 2020/0171743 A1* | 6/2020 | Kemperle | B33Y 40/00 |

FOREIGN PATENT DOCUMENTS

| | | |
|---|---|---|
| WO | WO-2018063217 A1 | 4/2018 |
| WO | WO-2018074988 A1 | 4/2018 |
| WO | WO-2019022762 A1 | 1/2019 |

\* cited by examiner

SENSING BUILD MATERIAL IN ADDITIVE MANUFACTURING SYSTEMS

BACKGROUND

Additive manufacturing systems can be used to manufacture three-dimensional (3D) objects. This can be achieved, for example, by forming successive layers of a build material on a build platform and selectively solidifying portions of those layers to build up a 3D object. A build unit may contain a store of build material which is to be supplied to the build platform by a build material supply system. A build material supply system may include a build material feed tray into which build material from the store is fed, and a feed vane that assists in the supply of build material to the build platform from the feed tray.

BRIEF DESCRIPTION OF THE DRAWINGS

Some non-limiting examples of the present disclosure will be described in the following with reference to the appended drawings in which.

DETAILED DESCRIPTION

Some additive manufacturing systems use build material which is spread over a build platform to form a build material layer. Selected portions of the build material layer may be solidified, for example by fusing, sintering, melting, binding or otherwise joining the build material using, for example, heat and/or a fusing agent. The build platform may then be lowered by a predetermined amount and a new build material layer may be formed on the previously formed layer.

The build material may comprise any suitable form of build material, for example fibres, granules or powders. The build material can include thermoplastic materials, ceramic material and metallic materials. A store of build material may be provided in a supply vessel and build material may be distributed from the supply vessel to form an intermediate volume of build material from which build material may be spread over a build platform, either directly, or indirectly.

Figure 1:
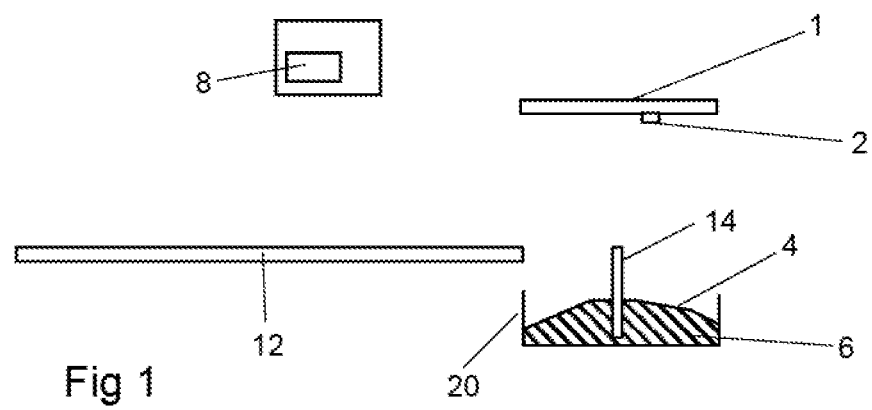
FIG. 1 shows a part of a simplified example additive manufacturing system.

Part of an example additive manufacturing system is shown in a simplified manner FIG. 1. A sensor module 1 having a distance sensor 2 provides an indication of a position of a top surface 4 of a volume 6 of build material. The distance sensor 2 may be any suitable sensor that is capable of sensing a top surface 4 of the volume of build material 6, and providing an indication of a distance between the sensor and a top surface 4 of the volume of build material 6.

In one example, the distance sensor 2 may be laser sensor, or other electromagnetic sensor, which may emit an electromagnetic pulse and receive a pulse reflected from the top surface 4 to allow a distance between the distance sensor and the top surface 4 to be determined. In another example, the distance sensor 2 may be an ultrasound sensor which may emit an ultrasonic pulse and receive a pulse reflected from the top surface 4 to allow a distance between the distance sensor and the top surface 4 to be determined. In another example, the distance sensor may be an inductive or capacitive sensor which may provide an indication of the proximity of the top surface 4 of the volume of build material 6 to the distance sensor 2.

A processor 8 is provided to determine whether the volume of build material 6 should be reformed based on the indication from the distance sensor 2. For example, it may be determined that the volume of build material should be reformed if the indication of the position of the top surface 4 of the volume of build material 6 from the distance sensor 2 suggests that a depth of build material in the volume of build material 6 is below a predetermined threshold. A depth below a predetermined threshold may be indicative that there is insufficient build material in the volume of build 6 material to form an acceptable build material layer.

Figure 2:
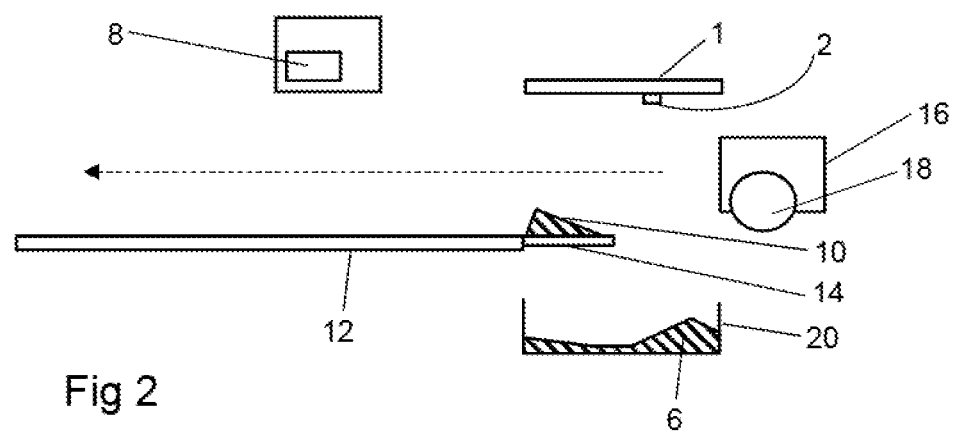
FIG. 2 shows the part of the simplified example additive manufacturing system of FIG. 1 in a second configuration.

As shown in FIG. 2, if the processor 8 does not determine that the volume of build material 6 should be reformed, build material is taken from the volume of build material 6 to provide a ridge 10 of build material adjacent a build platform 12. In this example the ridge 10 is lifted from the volume of build material 6 using a feed vane 14. The ridge 10 may be located between the build platform 12 and a spreader 16.

The spreader 16 may include a roller 18. Once the ridge 10 has been formed, the spreader 16 may be controlled to move across the build platform 12, for example in a linear manner to cause the roller 18 to spread the ridge 10 of build material over the build platform 12 to form a build material layer, portions of which can be selectively solidified. The build platform 12 can then be lowered by a predetermined amount, such as the thickness of the previous build material layer and a new build material layer may be formed on the previously formed layer.

Referring again to FIG. 1, the processor 8 may determine that the volume of build material 6 should be reformed based on the indication from the distance sensor 2. The reforming of the volume of build material 6 can be achieved in many ways as long as the build material in the volume of build material 6 is in some way disturbed. For example build material could be added the volume of build material 6, build material could be removed from the volume of build material 6, and/or build material within the volume of build material 6 could be redistributed. In this example the volume of build material 6 is formed in a feed tray 20.

In this example, the feed vane 14 could be moved, for example by an actuator such as a motor, to disturb the build material in, and thereby reform, or adjust, the volume of build material 6. It should be understood that other mechanisms for reforming the volume of build material 6 are possible and they will be described in more detail below.

During additive manufacture, using a sensor module 1 having a distance sensor 2 to provide an indication of a position of a top surface 4 of a volume of build material 6 may prevent, or reduce the likelihood of the formation of an irregular build material layer of build material on the build platform 12. An irregular build material layer of build material on the build platform may impact the quality of any object manufactured. The sensed position of the top surface 4 of the volume of build material 6 may be indicative of a distribution of build material in a build material layer created by spreading material from the volume of build material 6 over the build platform 12.

In an example, an uneven distribution of build material along a length of the feed tray 20, for example a lack of build material at an end of the feed tray 20, is likely to result in a ridge 10 of build material on the feed vane 14 which also lacks build material at an end and therefore the spreader 16 would be likely to create an irregular layer of build material when it recoats the build platform with a new build material layer.

Using a processor 8 to determine whether the volume of build material 6 should be reformed based on the indication from the sensor 2 allows the volume of build material 6 to be reformed, if necessary, prior to material therein being spread over the build platform 12. This may result in a more reliable formation of a regular build material layer of build material and thus result in a more reliable quality of product produced by the additive manufacturing system.

Determining whether or not the volume of build material 6 should be reformed may be based upon a single indication from the distance sensor 2 of a location. An indication of a position of the top surface 4 at a representative location in the feed tray 20 could be provided at, for example, a central location in the feed tray 20.

The sensor module 1 may include a plurality of distance sensors 2 and/or may be movable so that a location of the top surface 4 of the volume of build material 6 can be indicated in a plurality of locations as this may make the determination of acceptability more reliable. These options will be described in more detail later.

As set out above, build material could be added to, or removed from, the volume of build material 6 using a build material supply system. A build material supply system may be used to form the volume of build material 6.

Figure 3:
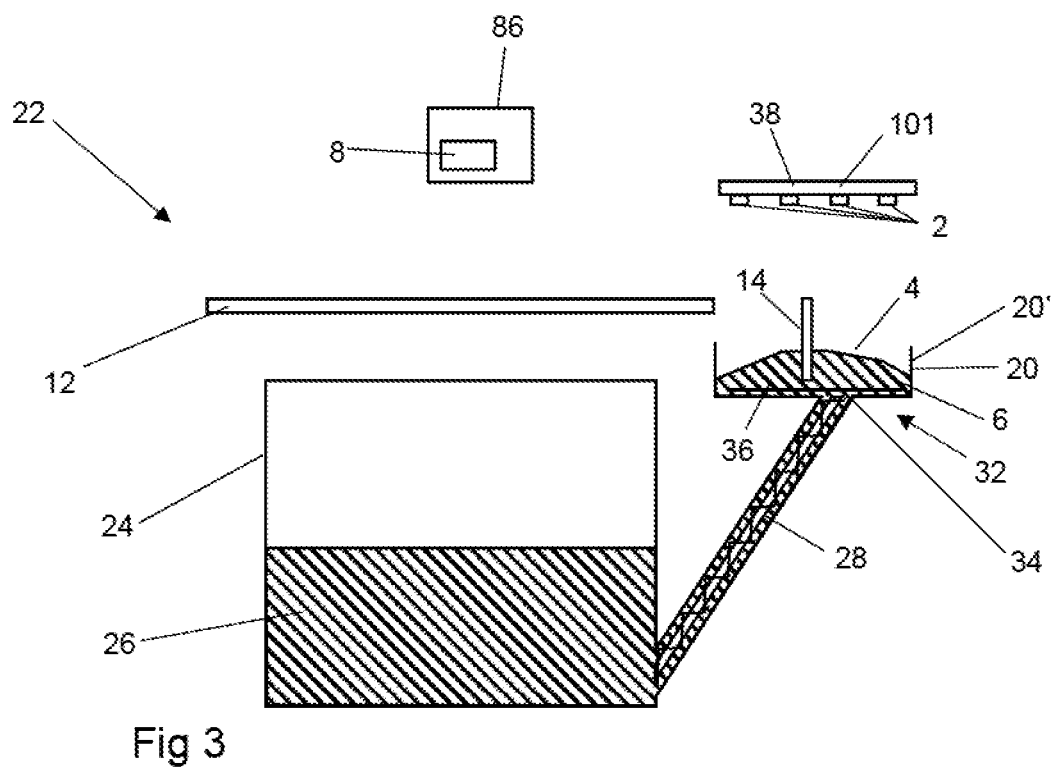
FIG. 3 shows a simplified view of an example of a build material supply system for an additive manufacturing system having a feed tray.

FIG. 3 shows a simplified view of an example of an additive manufacturing system including a build material supply system 22. In this example the build material supply system 22 comprises an intermediate vessel 20', in this example the feed tray 20, but an intermediate vessel in another example may be a hopper or other vessel. It should be understood that another example of a build material supply system 22 may not include an intermediate vessel.

The build material supply system 22 comprises a build material supply vessel 24 to contain a store 26 of build material. Build material can be distributed from the store 26, in this example it can be carried by an auger 28, or other suitable conveyor, to the feed tray 20.

As set out above, build material in the feed tray 20 forms a volume of build material 6. This volume of build material 6 may be considered an intermediate volume of build material. A shape and position of the top surface 4 of the volume of build material 6 may be dependent upon the composition of the volume of build material 6, the amount (for example weight) of build material in the volume of build material 6, and/or the distribution of build material within the volume of build material 6.

The composition and/or distribution of build material within the volume of build material 6 may be altered by a distributor 32 which can move build material from the region 34 into which it is supplied from the store 26. The distributor 32 may actively move build material to a different location, for example a conveyor such as a movable belt or auger screw, or a movable element or flap which engages a part of the volume of build material 6. The distributor 32 may provide energy into the volume of build material 6, for example using a vibrating grate, grid or plate, to thereby encourage build material within the volume of build material 6 to more evenly distribute itself. Such distribution may include fluidising all, or some, or the build material in the volume of build material 6 or disturbing the build material in the volume of build material 6 and allowing it to re-settle under gravity. More than one distributor 32 may be provided and may work in combination or separately to redistribute the volume of build material 6. In this example, the distributor 32 comprises a vibrating plate 36 and the feed vane 14. As set out above, the feed vane 14 can be moved back and forth within the volume of build material to redistribute, or adjust, the volume of build material 6 and may be operated at the same time as the vibrating plate 36.

The feed vane 14 may comprise a distribution element which can be actuated to disturb or redistribute the build material in the volume of build material without moving the feed vane 14 itself. The distribution element may comprise an auger screw which can be rotated by a motor, or other transducer, to move build material in a direction along a length of the feed vane 14.

The sensor module 101 of FIG. 3 comprises a plurality of distance sensors 2 in the form of an array 38 which will be described in more detail below. The processor 8 forms part of a controller 86 which will be described in more detail in connection with FIG. 10.

Figure 4:
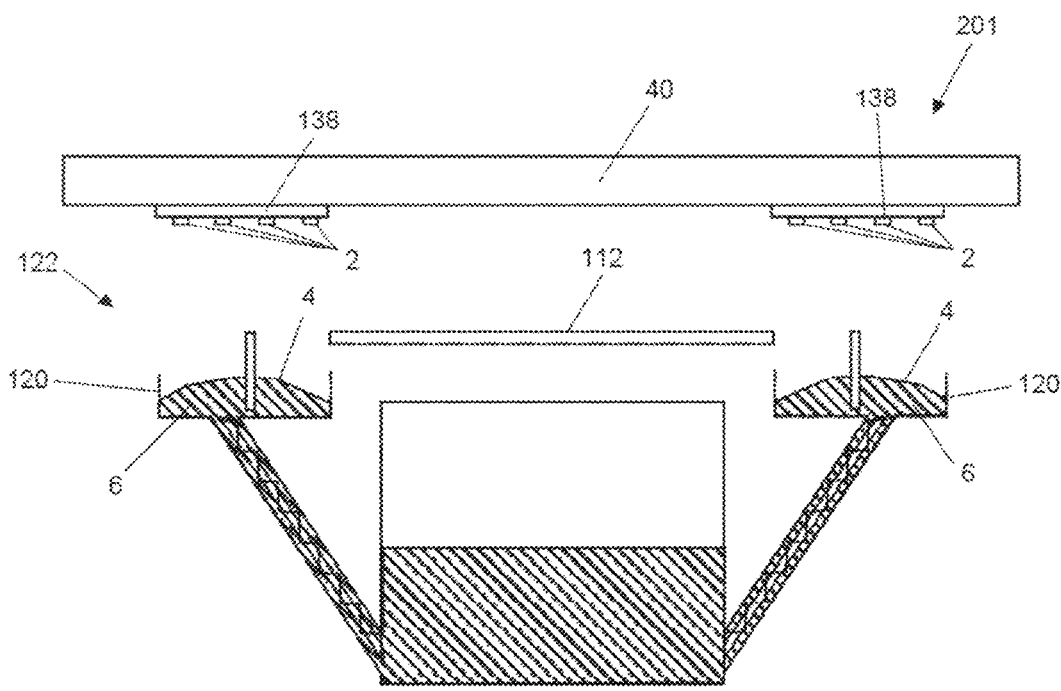
FIG. 4 shows a simplified view of an example of a build material supply system for an additive manufacturing system having two feed trays.

FIG. 4 shows a simplified view of an example of an additive manufacturing system comprising a build material supply system 122 having two feed trays 120 on opposing sides of a build platform 112.

In this example the additive manufacturing system is similar in structure to the example of FIG. 3. However, in this example the sensor module 201 comprises two sensor arrays 138 which are described in more detail with reference to FIG. 5.

The sensor arrays 138 in this example are mounted to a cover 40 of the additive manufacturing system. The cover 40 is closed during an additive manufacturing process so that it overlies the build platform 112 and feed trays 120. The cover may include a heater for warming the build platform and/or may provide some environmental protection. The sensor arrays 138 are mounted to the cover 40 so that, when the cover 40 is closed, each of the arrays 138 is aligned with the location of a volume of build material 6, in this example with one of the feed trays 120. This static alignment of the sensor arrays 138 and the feed trays 120 in use may simplify the use of the distance sensors 2 of the arrays to provide an indication of a position of a top surface of a volume of build material 6 in the feed tray 20 with which it is aligned.

Figure 5:
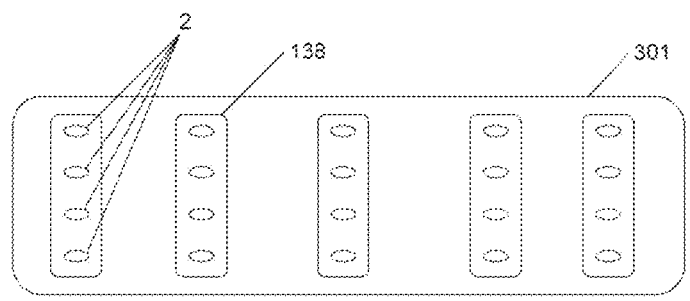
FIG. 5 shows an example of a sensor array of an example sensor module.

FIG. 5 shows an example of a sensor array 138 of an example sensor module 301 for use in an additive manufacturing system. In this example, the sensor module 301 comprises twenty distance sensors 2 in five groups of four to provide an indication of the position of the top surface (e.g., top surface 4 of FIG. 4) in twenty different locations of the volume of build material (e.g., build material 6 of FIG. 4).

Figure 6:
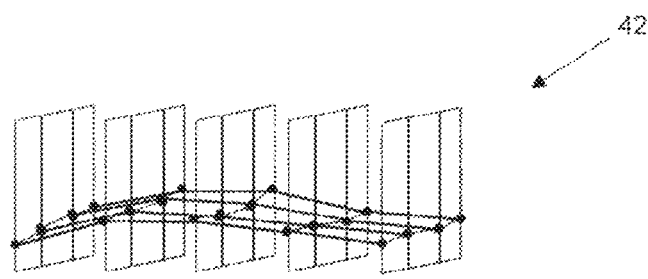
FIG. 6 shows a simplified diagram of an example of a map of a volume of build material.

FIG. 6 shows a simplified diagram of an example of a map 42 of a volume of build material 6. The map 42 indicates the position of a top surface 4 of a volume of build material 6. The creation of a map 42 may facilitate the determination of the acceptability, or otherwise, of the volume of build material 6. For example an acceptability criteria for the volume of build material 6 may be that the map 42 of the top surface 4 is substantially planar, or that there are no peaks or troughs that differ from the average surface height by more than a predetermined percentage.

Figure 7:
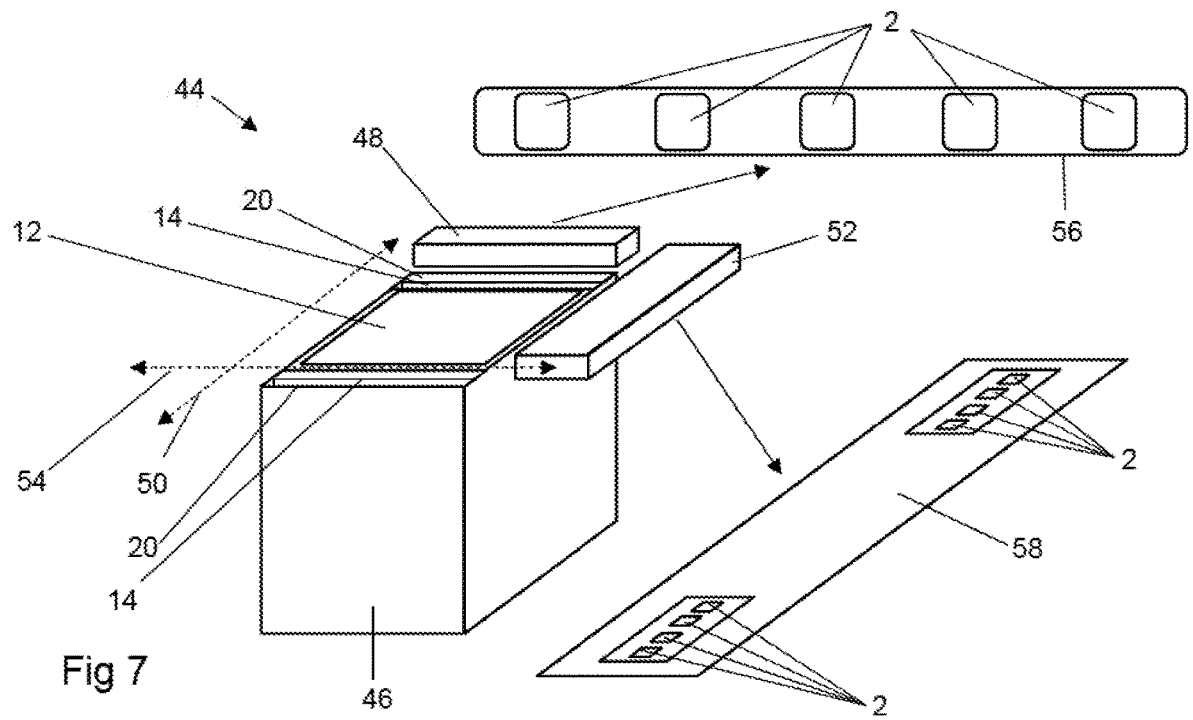
FIG. 7 shows a simplified view of an example of an additive manufacturing system.

A simplified view of an example of parts of an additive manufacturing system 44 is shown in schematic FIG. 7. The example additive manufacturing system 44 comprises a build unit 46 which, in this example, includes two feed trays 20, each including a feed vane 14. The feed trays 20 are arranged on opposite sides of a build platform 12 and build material is distributed to the feed trays 20 from a build material store 26 within the build unit 46. In this example the build material store 26 is not visible in this figure as it is within the build unit 46.

The additive manufacturing system 44 includes a recoater 48 which spreads build material across a build platform 12 to form a build material layer. The recoater 48 in this example comprises a spreader 16 having a roller 18 which engages a volume of build material to be spread. In this example, the volume of build material to be spread is a ridge 10 of build material lifted from the volume of build material in a feed tray 20 by a feed vane 14 as set out in connection with FIGS. 1 and 2.

The recoater 48 is controlled to move over the build platform 12 in a first direction 50 to spread a build material layer of build material on the build platform 12. Once a build material layer has been formed on the build platform 12 a carriage 52 moves over the build platform 12 to selectively solidify portions of the build material layer. The carriage 52 in this example moves in a second direction 54 which is substantially perpendicular to the first direction 50, although this may not be the case in all examples.

During use the recoater 48 and carriage 52 pass over the build platform 12 and also pass over the feed trays 20. In this example the recoater 48 passes over a width of the feed trays 20, while the carriage passes along a length of the feed trays 20. A sensor module, not visible in this Figure, may comprise a distance sensor, or sensor array, which is movable relative to a location of a volume of build material 6, in this example the feed trays 20. A movable distance sensor 2, or sensor array, may be coupled to the recoater 48 or the carriage 52.

FIG. 7 provides an indication of an example of a sensor array 56 which is suitable for coupling to the recoater 48 and which could, with appropriate control provide a similar map of the surface of the volume of build material as the static sensor array 138 of FIG. 5. The sensor array 56 of this example comprises five distance sensors 2 which are distributed along a length of the sensor array 54 and recoater 48. As the sensor array 56 passes over a feed tray 20 four measurements from each of the distance sensors 2 can be taken at different positions to provide a total of twenty measurements which can be used to create a map of a top surface 4 of the volume of build material 6 in that feed tray 20. In another example the sensor array 56 could be similar to the sensor array 138 of FIG. 5 comprising five groups of four distance sensors so that a single measurement from the array would provide the twenty measurement points.

FIG. 7 also provides an indication of an example of a sensor array 58 which is suitable for coupling to the carriage 52 and which could, with appropriate control provide a similar map of the surface of the volume of build material as the static sensor array 138 of FIG. 5. The sensor array 58 of this example comprises two groups of four distance sensors 2. The groups are arranged adjacent ends of the carriage 52 so that each group is aligned with a feed tray 20. The distance sensors 2 of each group are distributed across the width of the feed tray with which the group 58 is aligned. As the carriage passes over the build platform, the sensor array 58 passes over the feed trays 20 and four measurements from each of the distance sensors 2 can be taken to provide a total of sixteen measurements which can be used to create a map of a top surface of the volume of build material 6 in the feed tray 20.

It should be noted that with a distance sensor, or sensor array, which is movable relative to a location of a volume of build material, measurements can be made as the distance sensor, or sensor array, passes over a target of interest. The measurement could be made at pre-set distances apart, for example to provide an array of five by four readings of the top surface 4 of the volume of build material. It should be understood that more, or fewer, measurements could be made. It should also be understood that all distance sensors in a sensor array may not make a measurement at the same time.

Depending upon the criteria to be used for determining whether the volume of build material is acceptable without adjustment or reforming the number of measurements may be greater, or fewer, than twenty.

For example, an acceptance criteria might comprise that the readings are indicative that at least a minimum threshold amount of build material is present in the volume of build material. The minimum threshold may be, for example, the amount of build material that will be used to create the next build material layer, or, for example, the amount of build material that will be used to create the next build material layer plus a predetermined percentage. It should be noted that the amount of build material to create the next build material layer may vary if the intended build material layer thickness changes. The position of a top surface of the volume of build material may be indicative of a depth of the volume of build material at that location and the various indications obtained from the sensor module may provide an indication of the amount, for example the volume, of build material in the volume of build material.

An acceptance criteria may comprise that the readings are indicative of a distribution along a length of the volume of build material, and/or across the width of the volume of build material is sufficiently even to result in the creation of an acceptably regular build material layer if the process is allowed to proceed.

In an example the readings may be indicative of a position of a top surface of the volume of build material and the acceptance criteria might comprise that the indicative positions of the top surface differ by less than a predetermined variance threshold for all the sensor readings and that the indicative positions of the top surface are, at each location, representative of an amount of build material in the build material volume greater than the amount of build material required to form the next build material layer.

The acceptability criteria may change for each layer, or may be the same for every layer. The criteria may also change depending upon the required quality of the object being created.

The movement of the distance sensor, or sensor array, may be caused by movement of a component of the additive manufacturing system to which it is attached, such as the recoater or carriage, or the distance sensor, or sensor array, may be movable independently of such components which are used during additive manufacturing.

Determining when the distance sensor, or sensor array, is aligned with a volume of build material can be achieved in a variety of ways, for example by tracking movement of the carriage or recoater from a home, or rest position, or by having alignment indications on the feed trays 20, or on a track along which the movement occurs. Using movable sensors in this way could simplify the construction of the sensor array by using fewer sensors to create a predetermined number of measurements.

Figure 8:
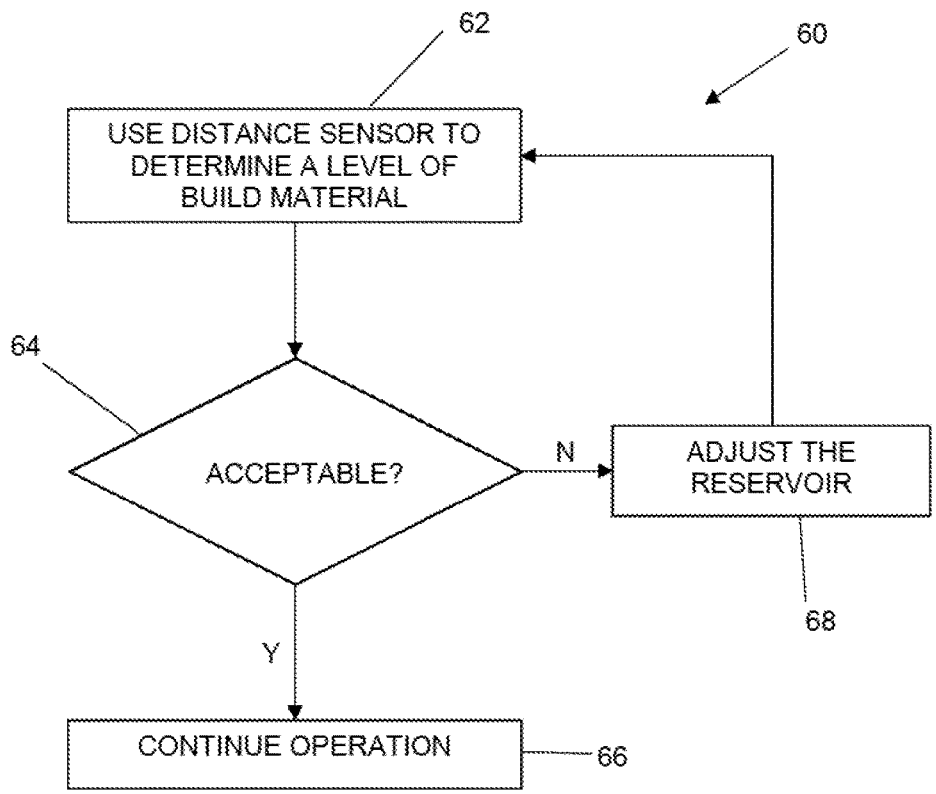
FIG. 8 shows a flow chart showing an example of a method of operating an additive manufacturing system.

FIG. 8 shows a flow chart showing an example of a method 60 of operating an additive manufacturing system. The example method 60 comprises at 62 using a distance sensor to sense, or detect, a location of a top surface of build material in a volume of build material formed in an additive manufacturing system. The volume of build material may be formed in a feed tray, or may be a ridge of material to be spread over a build platform, or may be another volume of build material the composition of which may be indicative, or predictive, or a quality of a build material layer formed on the build platform. As an example, a volume of build material in a feed tray having a substantially uniform distribution of build material throughout the volume of build material may be indicative of the formation of a ridge of material on a feed vane that will also have a substantially uniform distribution of build material along a length of the feed vane and this may be indicative that spreading that ridge of material over the build platform will produce a substantially uniform build material layer.

At 64 the method determines whether the sensed location of a top surface of build material in the volume of build material is acceptable. Acceptable may mean that the sensed location of a top surface indicates that, if the operation continues, as at 66, and the build material in the volume of build material is used to form a build material layer, the resulting build material layer will satisfy quality criteria, for example uniformity of the build material layer.

At 68 the volume of build material is adjusted if the sensed location of a top surface of build material in the volume of build material is not considered to be acceptable. The adjusting may comprise adding material to the volume of build material, removing material to the volume of build material or redistributing material within the volume of build material. Removing material from the volume of build material may include removing all of the material from the volume of build material and providing a replacement volume of build material, for example returning a ridge of material to a feed tray and creating a new ridge of material.

Figure 9:
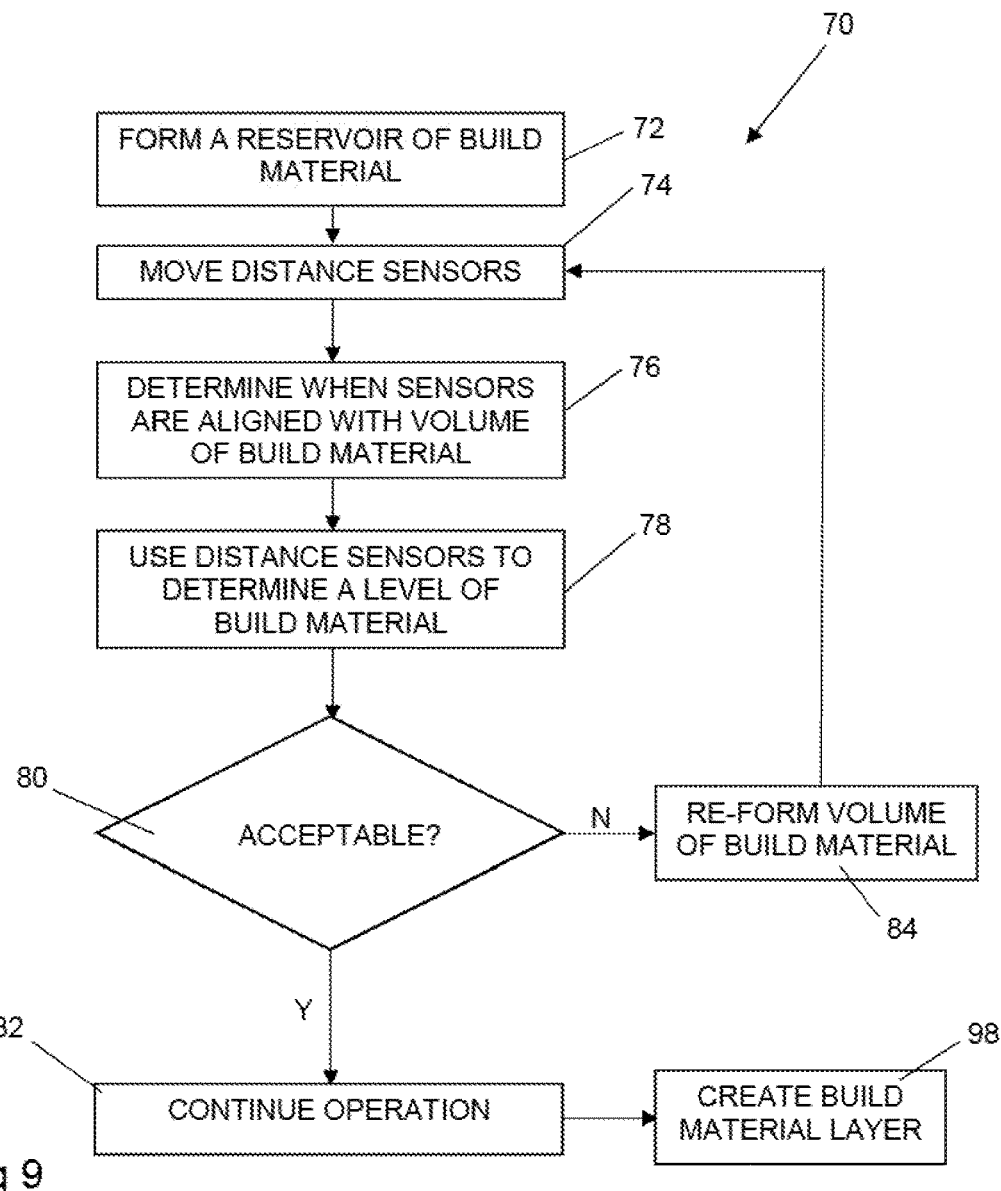
FIG. 9 shows a flow chart showing an example of a method of operating an additive manufacturing system having a movable sensor module.

FIG. 9 shows a flow chart showing an example of a method 70 of operating an additive manufacturing system having a movable sensor module. The example method comprises at 72 forming a volume of build material. As previously noted, this volume of build material could be formed in a feed tray, could be formed on a feed vane, or elsewhere in the additive manufacturing system.

The example method 70 comprises at 74 moving distance sensors, for example by moving a carriage or recoater to which the sensors, or an array of sensors, is mounted.

At 76 the method 70 determines when the sensors are aligned with the volume of build material formed at 72. When the sensors are aligned the distance sensors are used at 78 to determine a level of build material in the volume of build material.

At 80 the method determines whether the determined level of build material in the volume of build material is acceptable. As above, acceptable may mean that the determined level suggests that, if the operation continues, as at 82, and the build material in the volume of build material is used to create a build material layer, as at 98, the resulting build material layer will satisfy quality criteria for example uniformity of the build material layer. In one example the build material layer may be created directly by spreading the volume of build material over the build platform. In another example the build material layer may be created indirectly, for example by creating a ridge of build material from the volume of build material and then spreading the ridge of build material over the build platform.

At 84 the volume of build material is re-formed if the determined level of build material in the volume of build material is not considered to be acceptable. As set out above, the re-forming, or adjusting, of the volume of build material may comprise adding material, removing material or redistributing material within the volume of build material. Removing material may include removing all of the material and providing a replacement volume of build material.

Once the volume of build material has been reformed the method returns to 74 in which the distance sensors are moved so that they can become aligned with the volume of build material.

Figure 10:
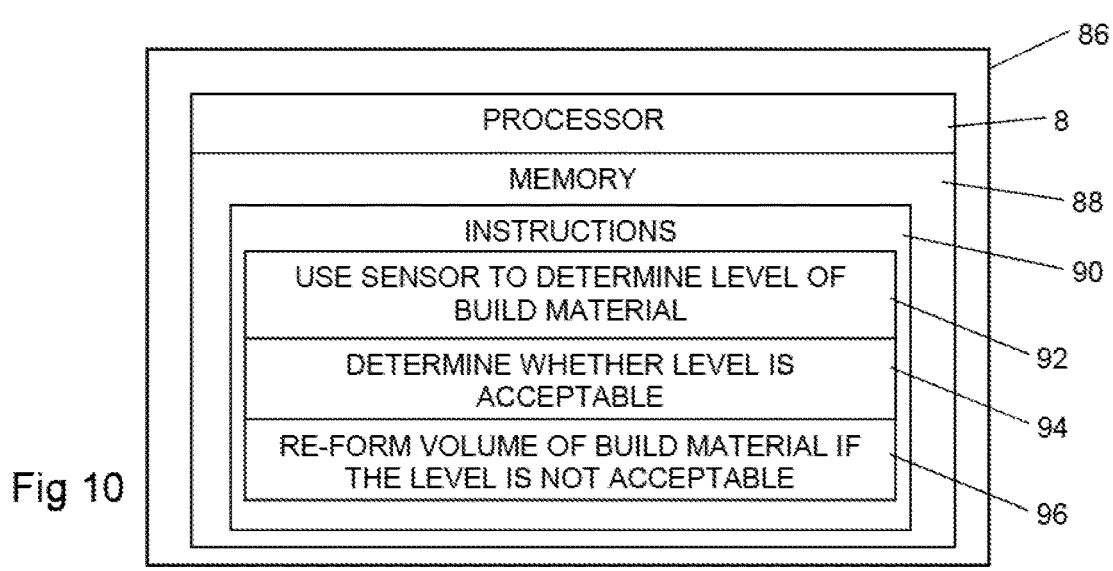
FIG. 10 shows a simplified block diagram of an example of a controller.

FIG. 10 shows a simplified block diagram of an example of a controller 86 for use in an additive manufacturing system. The controller 86 may be suitable for controlling the carrying out of methods such as those described above. The controller 86 may comprise a processor 8 coupled to a memory 88. The memory 88 may store instructions 90 which, when carried out by the processor 8, control the operation of some, or all, or the systems and methods described herein. In an example the instructions 90 may comprise instructions 92 to use a sensor to determine a level of build material in a volume of build material, instructions 94 to use the processor to determine whether the level is acceptable and instructions 96 to re-form the volume of build material if the level is not acceptable.

The invention claimed is:

1. An additive manufacturing system comprising:
   a sensor module having a distance sensor to provide indications of different height positions of a top surface of a volume of build material;
   one or more processors to determine whether the volume of build material should be adjusted based on the indications of the different height positions of the top surface relative to a minimum threshold amount of the build material to create a next build material layer; and
   a feed vane that adjusts the volume of build material, based on the different height positions of the top surface relative to the minimum threshold amount for creating the next build material layer for the volume of the build material, upon the one or more processors determining that the volume of build material should be adjusted for at least one of the different height positions.

2. The additive manufacturing system of claim 1, in which the sensor module comprises a sensor array comprising a plurality of distance sensors to provide the indications of the different height positions of the top surface, the plurality of distance sensors including the distance sensor, and wherein the one or more processors determine that the volume of build material should be adjusted for the at least one of the different height positions based on using the sensor array and the minimum threshold amount.

3. The additive manufacturing system of claim 2, in which the sensor array is fixed to a top cover of the additive manufacturing system, the sensor array aligned with the volume of build material in the different height positions when the top cover is closed.

4. The additive manufacturing system of claim 3, in which the sensor module comprises two sensor arrays including the sensor array fixed to the top cover of the additive manufacturing system, each sensor array aligned with a different location of the volume of build material.

5. The additive manufacturing system of claim 2, wherein the sensor array is movable relative to a location of the volume of build material.

6. The additive manufacturing system of claim 5, in which the sensor array is mounted on a carriage or recoater which moves relative to the location of the volume of build material.

7. The additive manufacturing system of claim 1, wherein the feed vane adjusts the volume of build material by removing the build material at the at least one of the different height positions of the top surface and forms a ridge of the build material, the additive manufacturing system further comprising:
- a build platform;
- a spreader to spread successive layers of build material on the build platform, wherein the spreader spreads the ridge; and
- a feed tray containing the volume of build material.

8. The additive manufacturing system of claim 1, in which the distance sensor is a laser sensor.

9. A method comprising:
- using a plurality of distance sensors to sense different height positions on a top surface of build material in a volume of build material formed in an additive manufacturing system;
- generating a map of the top surface of build material based on the different height positions sensed by the plurality of distance sensors;
- based on generating the map with the different height positions, determining that at least one of the different height positions on the top surface of build material should be adjusted; and
- adjusting the at least one of the different height positions.

10. The method of claim 9, wherein the at least one of the different height positions is adjusted based on an amount of build material for creating a next build material layer.

11. The method of claim 10, in which the plurality of distance sensors are movable relative to the top surface of build material, and wherein the method further comprises moving the plurality of distance sensors relative to the the different height positions to generate the map of the top surface.

12. The method of claim 9, in which adjusting the at least one of the different height positions comprises providing additional build material to increase a height for the at least one of the different height positions.

13. The method of claim 9, in which adjusting the volume of build material comprises redistributing build material at the at least one of the different height positions within the volume of build material.

14. The method of claim 9, in which adjusting the volume of build material comprises removing material from the at least one of the different height positions.

15. A non-transitory computer-readable storage medium comprising computer executable instructions which, when executed by one or more processors, cause an additive manufacturing system to perform a method, the method comprising:
- using a distance sensor to determine different height positions on a top surface of build material formed in the additive manufacturing system;
- based on using the distance sensor to determine the different height positions, determining that a first position of the different height positions in the additive manufacturing system should be adjusted based on a first height position of the first position relative to a threshold build material amount; and
- adjusting the first position to a different height based on determining that the first position should be adjusted.

16. The non-transitory computer-readable storage medium of claim 15, further comprising:
- using a plurality of distance sensors including the distance sensor to determine the different height positions on the top surface;
- generating a map of the different height positions based on using the plurality of distance sensors; and
- determining that the first position should be adjusted based on the map.

17. The non-transitory computer-readable storage medium of claim 16, wherein the map is generated based the plurality of distance sensors being moved across the top surface such that the plurality of distance sensors sense the different height positions along the top surface.

18. The non-transitory computer-readable storage medium of claim 15, wherein a feed vane adjusts the first position to the different height by forming a ridge of build material and spreading the ridge of build material.

19. The method of claim 9, further comprising:
- using the plurality of distance sensors to sense a second plurality of different height positions on a second location of the top surface of build material as the plurality of distance sensors are moved across the top surface of build material, the different height positions being a different location on the top surface than the second location;
- generating the map of the top surface of build material based on the different height positions and the second plurality of different height positions on the second location of the top surface; and
- based on generating the map, determining that the at least one of the different height positions on the different location of the top surface of build material should be adjusted based on a distribution of the map along a length of the top surface of build material and a width of the top surface of build material associated with the different height positions and the second plurality of different height positions.

20. The method of claim 19, further comprising:
- based on generating the map, determining that the at least one of the different height positions should be adjusted based on comparing each of the different height positions and the second plurality of different height positions to a predetermined variance threshold.

* * * * *